United States Patent
Heinzen (10) Patent No.: US 7,405,818 B2
(45) Date of Patent: *Jul. 29, 2008

(54) SELF MONITORING STATIC SEAL WITH OPTICAL SENSOR

(76) Inventor: Ralph Heinzen, P.O. Box 728, Garrison, ND (US) 58540

( * ) Notice: Subject to any disclaimer, the term of this patent is extended or adjusted under 35 U.S.C. 154(b) by 1114 days.

This patent is subject to a terminal disclaimer.

(21) Appl. No.: 10/619,806

(22) Filed: Jul. 15, 2003

(65) Prior Publication Data

US 2004/0075218 A1 Apr. 22, 2004

Related U.S. Application Data

(63) Continuation-in-part of application No. 09/089,580, filed on Jun. 3, 1998, now Pat. No. 6,595,523, and a continuation-in-part of application No. 09/090,056, filed on Jun. 3, 1998, now Pat. No. 6,615,639.

(51) Int. Cl.
*G01N 1/10* (2006.01)

(52) U.S. Cl. .................. 356/246; 277/321; 277/919; 73/7; 116/208

(58) Field of Classification Search ......... 356/244–246, 356/432–440, 410; 73/7; 116/208; 277/321, 277/919
See application file for complete search history.

(56) References Cited

U.S. PATENT DOCUMENTS

| | | | |
|---|---|---|---|
| 1,706,181 A | 3/1929 | Nelson | |
| 3,113,813 A | 12/1963 | Lobeck | |
| 3,321,045 A | 5/1967 | Veilleux | |
| 3,556,258 A | 1/1971 | Winge et al. | |
| 3,572,858 A | 3/1971 | Pompei | |
| 3,597,096 A * | 8/1971 | Burkhard | 356/246 |
| 3,679,277 A * | 7/1972 | Dohmen | 384/480 |
| 3,716,113 A | 2/1973 | Kobayashi et al. | |
| 3,914,752 A | 10/1975 | Howard et al. | |
| 4,028,928 A | 6/1977 | van Dalen et al. | |
| 4,178,133 A | 12/1979 | Rawicki | |
| 4,184,145 A | 1/1980 | Fima | |
| 4,290,611 A | 9/1981 | Sedy | |
| 4,320,431 A | 3/1982 | Bell | |
| 4,495,810 A | 1/1985 | Tessarzik et al. | |
| 4,497,493 A | 2/1985 | Sall et al. | |
| 4,517,291 A | 5/1985 | Seago | |
| 4,604,182 A | 8/1986 | Seago | |

(Continued)

FOREIGN PATENT DOCUMENTS

DE 3444175 6/1986

(Continued)

*Primary Examiner*—Hoa Q Pham
(74) *Attorney, Agent, or Firm*—Kinney & Lange, P.A.

(57) ABSTRACT

A seal for preventing leakage of fluid from between a first member and a second member has a seal body and a seal wear indicator. The second member is capable of moving toward and away from the first member. The seal body is adapted for engaged contact with the first and second members so as to prevent leakage of fluid as long as the seal has not worn beyond a specified depth. A seal wear indicator is positioned within the seal body at approximately the specified depth, such that when the seal has worn to the specified depth, a change in the optical conductor is detected, indicating that the seal needs replacement.

23 Claims, 5 Drawing Sheets

U.S. PATENT DOCUMENTS

| | | | |
|---|---|---|---|
| 4,647,077 A | 3/1987 | Ethridge et al. | |
| 4,722,662 A | 2/1988 | Morgan | |
| 4,745,353 A | 5/1988 | Stewart et al. | |
| 4,761,023 A | 8/1988 | Troxell, Jr. | |
| 4,832,160 A | 5/1989 | Fargier et al. | |
| 4,833,440 A | 5/1989 | Wojtanek | |
| 4,915,510 A | 4/1990 | Arvidsson | |
| 4,936,197 A | 6/1990 | Brent | |
| 4,972,867 A | 11/1990 | Ruesch | |
| 4,982,767 A | 1/1991 | Pezzoli et al. | |
| 5,004,090 A | 4/1991 | Kuribara et al. | |
| 5,025,652 A | 6/1991 | Bielfeldt | |
| 5,038,884 A | 8/1991 | Hamada et al. | |
| 5,074,663 A * | 12/1991 | Winterton et al. | 356/244 |
| 5,111,178 A | 5/1992 | Bosze | |
| 5,120,129 A * | 6/1992 | Farquharson et al. | 356/246 |
| 5,246,235 A | 9/1993 | Heinzen | |
| 5,419,415 A | 5/1995 | Lamb et al. | |
| 5,452,082 A * | 9/1995 | Sanger et al. | 356/246 |
| 5,540,448 A | 7/1996 | Heinzen | |
| 5,608,376 A | 3/1997 | Ito et al. | |
| 5,934,415 A | 8/1999 | Preston et al. | |
| 6,003,872 A | 12/1999 | Nord | |
| 6,080,982 A * | 6/2000 | Cohen | 250/227.11 |
| 6,595,523 B1 * | 7/2003 | Heinzen | 277/321 |
| 6,615,639 B1 * | 9/2003 | Heinzen | 73/7 |
| 6,980,298 B2 * | 12/2005 | Discenzo | 356/477 |

FOREIGN PATENT DOCUMENTS

| | | |
|---|---|---|
| EP | 0 291 104 | 11/1988 |
| FR | 2 574 508 | 6/1986 |
| GB | 2 172 945 A | 10/1986 |
| JP | 52031263 | 3/1977 |
| JP | 54005159 | 1/1979 |
| JP | 54117852 | 9/1979 |
| JP | 57204374 | 12/1982 |
| JP | 61079103 | 4/1986 |
| SU | 573648 | 9/1977 |
| SU | 976172 | 11/1982 |
| SU | 1307115 | 4/1987 |

\* cited by examiner

SELF MONITORING STATIC SEAL WITH OPTICAL SENSOR

CROSS-REFERENCE TO RELATED APPLICATIONS

This continuation-in-part application of my application Ser. Nos. 09/090,056 entitled "SELF MONITORING STATIC SEAL", now U.S. Pat. No. 6,615,639, and 09/089,580 entitled "SELF MONITORING MECHANICAL SEAL", now U.S. Pat. No. 6,595,523, both filed Jun. 3, 1998.

BACKGROUND OF THE INVENTION

The present invention relates to seals which are positioned against a moving surface, and more particularly to seals which prevent fluid, e.g. lubricant, leakage or passage between two surfaces. More particularly, the present invention relates to a self-monitoring seal employing an optical device for indicating when the body of a seal has undergone excessive wear or deterioration.

Machinery often includes members which move with respect to each other. Bearings have long been used to facilitate such movement, particularly for members that move rotationally with respect to each other. Brass rings or sleeves have long been used to facilitate such movement where the members are reciprocating with respect to each other. Bearings and brass rings are used to aid in transmitting forces from one member to another and to reduce friction. Rolling elements are often used in bearings to reduce friction, such as in ball bearings. Bearings often contain lubricant to reduce the friction created within the bearing.

Leakage of fluid from between mechanical parts has long been a problem. Contamination of the bearings or seals with foreign material such as dirt has also long been a problem. Both loss of fluid and contamination lead to increased friction and wear within the structure, damaging the structure and perhaps damaging the machinery.

Seals composed of a soft polymeric material are used with bearings to prevent lubricant leakage and contamination. The polymeric material contacts a moving surface in the bearing and provides a seal. Friction between the polymeric material and the moving surface gradually wears the surface of the polymeric material away. If the polymeric material becomes too worn, it will no longer form a tight seal against the moving surface, and fluid leakage from the bearing and contamination of the bearing again become problems.

In other instances metal or polymeric seals are placed between the moving parts. This arrangement is particularly useful when the movement is a reciprocal movement. Non-limiting illustrations of a reciprocating seal include a piston and cylinder structure, hatches, air locks, doors, covers, lids and caps. With regard to such seals as found in hatches, air locks, doors, covers, lids and caps, the interfitting members can reciprocate with respect to each other, in the sense of opening and closing with regard to each other. However, when a seal is in fluid tight sealing relationship between such interfitting members, the seal may more properly be termed a static or stationary seal, since the interfitting members and the interposed seal are all stationary with regard to each other while the integrity of the sealing relationship is maintained. Sealing integrity or effectiveness can also be compromised by cracking, breaking, loss of flexibility or deterioration due to such conditions as repeated flexing, bending and/or compression, or length of contact with various fluids or container contents.

Various methods have been developed to prevent or detect leakage past a seal. As shown in U.S. Pat. No. 4,761,023, one method involves monitoring the pressure of the fluid on the high pressure side of the seal, with a loss of pressure indicating leakage past the seal. Alternatively, as shown in U.S. Pat. No. 4,290,611, the fluid pressure on the low pressure side of the seal may be monitored, with an increase in pressure indicating fluid leakage. A third method, such as that shown in U.S. Pat. No. 4,178,133, uses colored fluid and visual monitoring of leakage past a seal. Still other methods involve manual maintenance procedures, wherein seals are inspected or replaced on a regular basis.

These various methods to prevent or detect leakage past a seal have not proven satisfactory due to a number of problems. A problem with monitoring fluid pressure is that it is only effective to detect leakage of the fluid. Often this is too late to prevent damage. It is desired that the seal be replaced before leakage has begun. Similarly, visual monitoring of fluid leakage can only indicate that leakage has begun, not that leakage is about to begin. A problem with manual inspection of a seal is that it requires an inspector who is not only trained but also diligent. Often seals are not inspected merely due to neglect or lack of diligence. Another problem with manual inspection is that it may require the machinery to be stopped during the inspection, which can be inconvenient. Scheduled seal replacement also has problems. Seals may wear more or less quickly depending on operating conditions, and scheduled seal replacement may occur too early (before the seal needs to be replaced) or too late (after the seal starts leaking).

An excellent solution to these problems has been provided by the inventions disclosed in my U.S. Pat. No. 5,540,448, issued Jul. 30, 1996, entitled SEAL WITH ELECTRICAL CONDUCTOR WEAR INDICATOR and in my U.S. Pat. No. 5,246,235, issued Sep. 21, 1993, entitled SEAL WITH EMBEDDED WIRE. The present invention is an improvement on my earlier disclosed seals and is particularly adapted to work with reciprocating surfaces which require a seal there between. Illustrative of such reciprocating surfaces are the piston and cylinder, hatches, air locks, doors, covers, lids, caps, etc.

SUMMARY OF THE INVENTION

A seal for preventing leakage between two members has a seal member and an optical indicator. The seal member is positioned to prevent fluid leakage from between two members and is more readily abraded than either of the two members. The seal member is adapted to maintain a fluid tight seal with the two members until it is abraded beyond a specified depth. The optical indicator is positioned within the seal member at or slightly above the specified depth to provide an indication that the seal needs replacing before the fluid tight seal is breached.

DETAILED DESCRIPTION OF THE INVENTION

Figure 1:
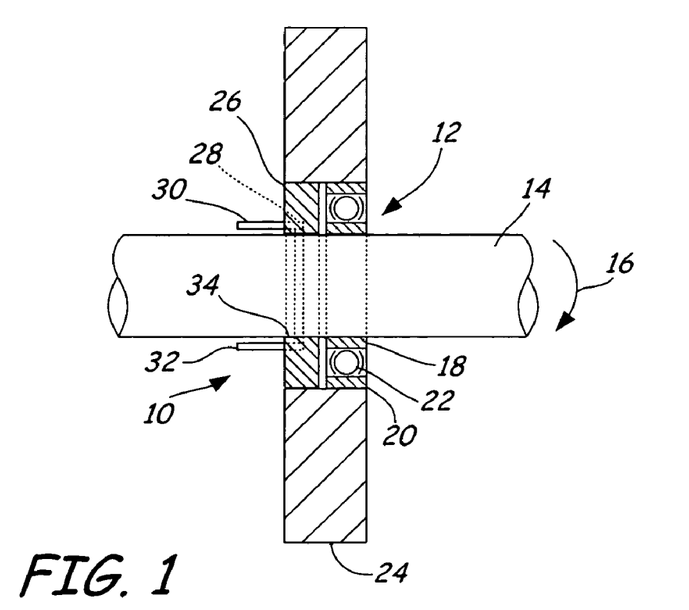
FIG. 1 shows a cross-sectional side view of the seal in place, adjacent a bearing and around a rotating shaft.

FIG. 1 shows a seal 10 of the present invention in place, against a bearing 12 and around a shaft 14. The shaft 14 rotates as indicated by arrow 16. The bearing 12 has an inside race 18, an outside race 20, and a plurality of rolling elements, e.g. balls 22. The inside race 18 is connected with the shaft 14 and rotates with the shaft 14. The outside race 20 is connected to the housing 24 and may remain stationary The rolling elements 22 may be spherical balls (or bearings) as shown, or may be other cylindrical or needle rolling elements.

The seal 10 of the present invention includes a seal body 26 and an embedded optical indicator 28. Leads or posts 30 and 32 connect with the optical indicator 28 and extend out from the seal body 26.

As shown, the optical indicator 28 may be a standard fiber optic cable or an optical cable formed from a material that glows or fluoresces when exposed or worn. Depending on the specific implementation, an optical sensor may be coupled with the optical indicator 28 to generate a signal when the optical indicator 28 is exposed or worn or when the optical indicator 28 is exposed to ambient conditions.

As shown in FIG. 1, the seal body 26 presses against the shaft 14, forming a tight seal between the seal body 26 and the shaft 14. Alternatively, the seal body 26 may press against the inside race 18, forming a tight seal between the seal body 26 and the inside race 18. The seal body 26 functions to prevent fluid leakage from the bearing 12.

The seal body 26 has a contact surface 34 defined as the surface which contacts the adjacent moving surface of the shaft 14 to form a tight seal. The seal body 26 may be composed of a polymeric material or other suitable substance. The material of the seal body 26 is generally softer than the shaft 14, so that friction preferentially wears the seal body 26 rather than the shaft 14. The contact surface 34 of the seal body 26 gradually wears away due to friction between the outer surface of the shaft 14 and the seal body 26.

Figure 2:
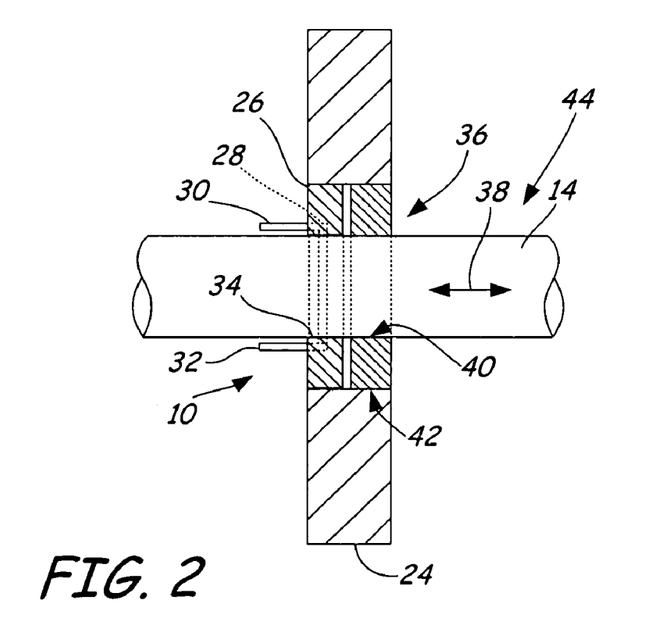
FIG. 2 shows a cross-sectional side view of the seal in place, adjacent a brass ring and around a reciprocating shaft.

FIG. 2 shows a seal 10 of the present invention in place, against a brass ring 36 and around a shaft 14. In this embodiment, the shaft 14 reciprocates as indicated by arrow 38. The brass ring 36 has an inside bearing surface 40 and an outside surface 42. The inside bearing surface 40 is in contact with the shaft 14 and slides along the surface of the shaft 14. The outside surface 42 may be connected to the housing 24.

The seal 10 has a seal body 26 and an embedded optical indicator 28. As in FIG. 1, the seal body 26 presses against the shaft 14, forming a tight seal between the seal body 26 and the shaft 14. The seal body 26 functions to prevent fluid leakage or to prevent exposure of a sealed portion 44 of the shaft 14 to the outside environment.

Figure 3:
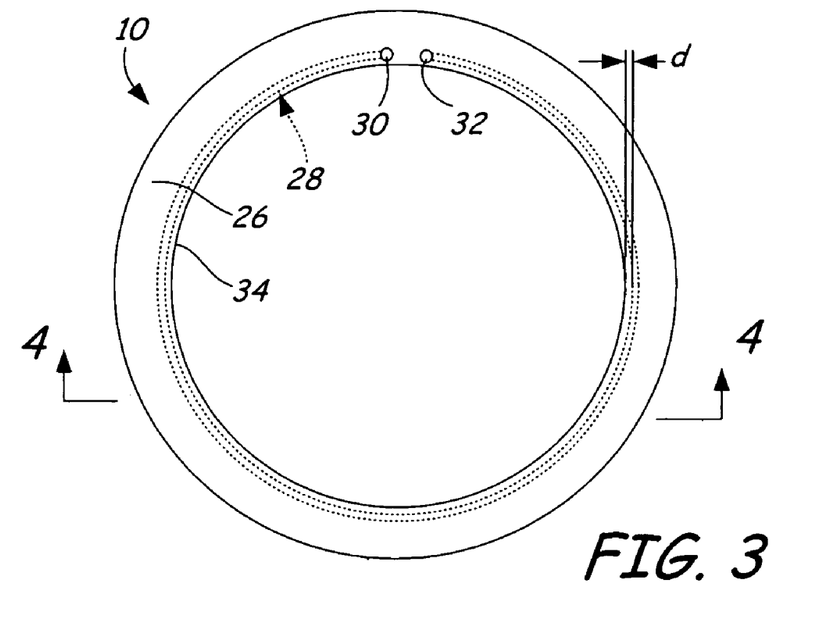
FIG. 3 is an enlarged top view of the seal of FIG. 1.

FIG. 3 shows an optical indicator 28 embedded within the seal body 26 at a specified depth (d). The optical indicator 18 may be composed of any material which conducts light, such as a fiber optic cable. The specified depth (d) at which the optical indicator 18 is embedded within the seal body 26 may be slightly less than the depth (d) of seal wear which will cause the seal 10 to leak.

The conductor 18 has a first post 30 and a second post 32 which extend outside the seal body 26. The first post 30 and the second post 32 are for connection to an exterior signaling circuit 46 (shown in FIGS. 4, 6, 8 and 9) or a light sensor (shown in FIGS. 9 and 10, and shown as a bar code reader in FIG. 11). The signaling circuit 46 may transmit an optical signal through the embedded indicator 18. If the optical indicator 18 is a fiber optic cable, discontinuity or a change in the optical signal can be detected, indicating a wear point in the optical indicator 18 such that the total internal reflectance of the fiber optic cable is disrupted. A discontinuity (or absence of optical continuity) or a change in the optical signal is an instance when the optical signal is either totally interrupted or when the optical signal is disrupted enough that a sensor in the signaling circuit 46 can detect a change in the received optical signal. Additionally, the signaling circuit 46 can generate a warning signal to an operator that the seal 10 requires replacement either based on the discontinuity or change in the optical signal.

Figure 5:
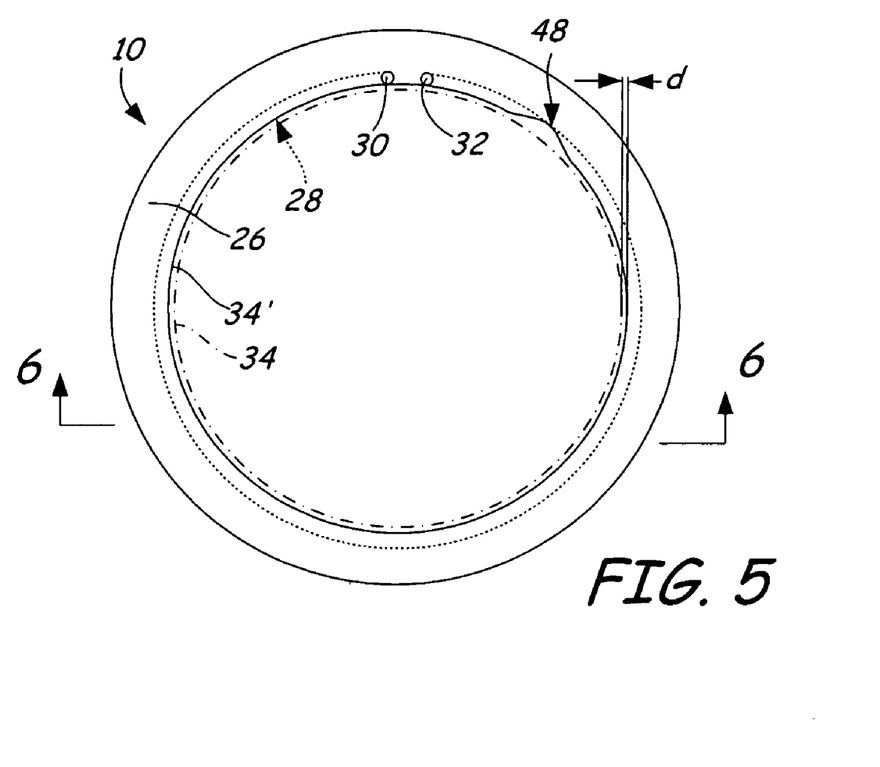
FIG. 5 is an enlarged top view of the seal of FIG. 1, after the seal body has worn to the specified depth (d).
Figure 6:
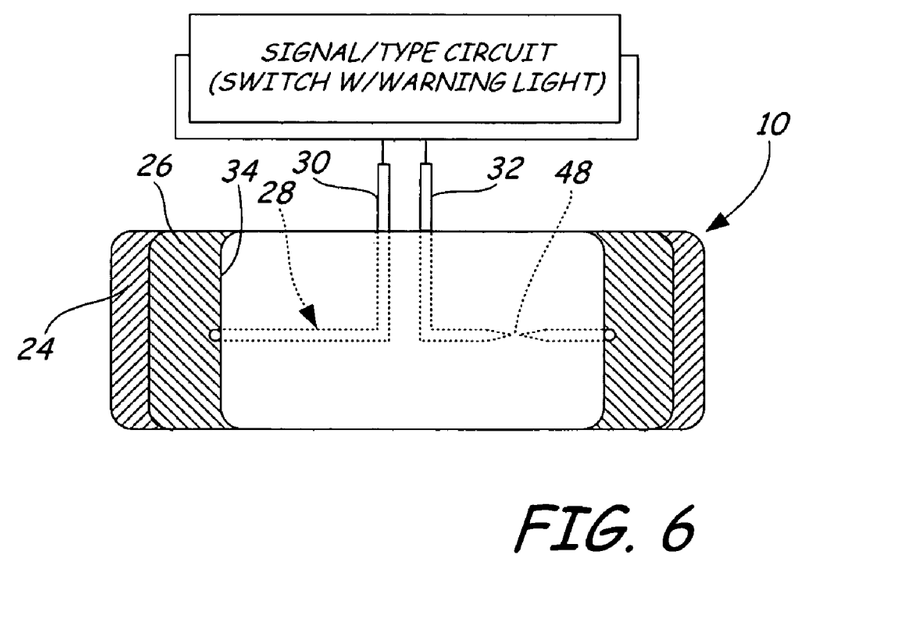
FIG. 6 is a cross-sectional view taken along the line 6-6 in FIG. 5, after the seal body has worn to the specified depth (d).

FIGS. 5 and 6 show the seal 10 immediately after friction between the shaft 14 and the seal body 26 has worn the seal body 26 to the specified depth (d). The original contact surface 34 is shown in phantom, while the current contact surface 34' of the seal body 26 is shown as a continuous line. As shown, the optical indicator 28 has worn completely through at point 48, causing a disruption or optical discontinuity between the first post 30 and the second post 32. A suitable mechanism (such as an optical sensor) may be provided in the signal-type circuit 46 to detect a change or a discontinuity in the optical signal, which may then trigger an alarm signal (such as a warning light) indicating the need for seal replacement.

Figure 7:
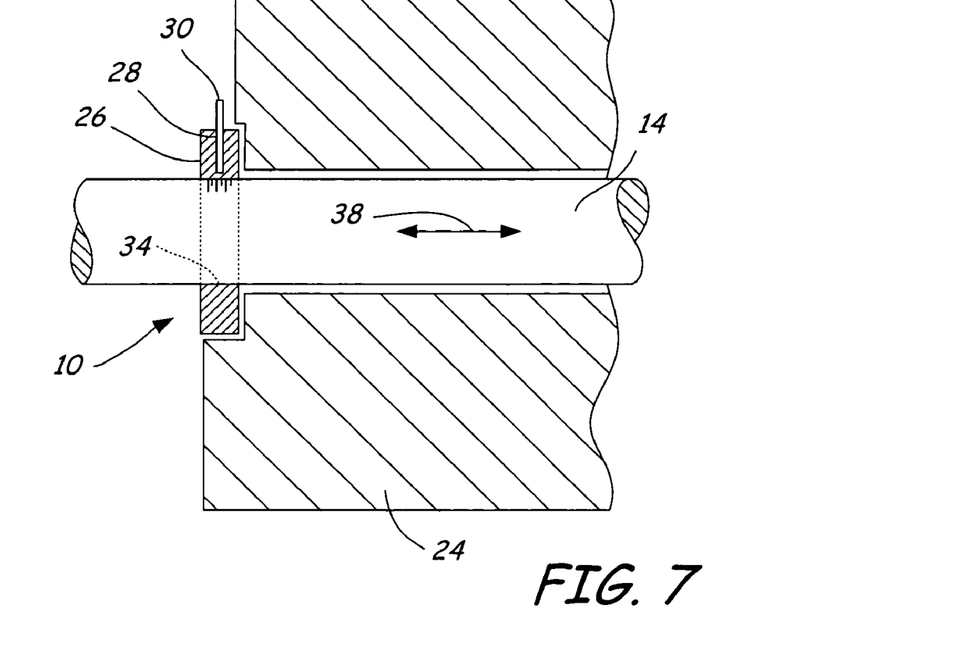
FIG. 7 shows a cross-sectional side view of an alternate embodiment of the seal in place around a shaft.
Figure 8:
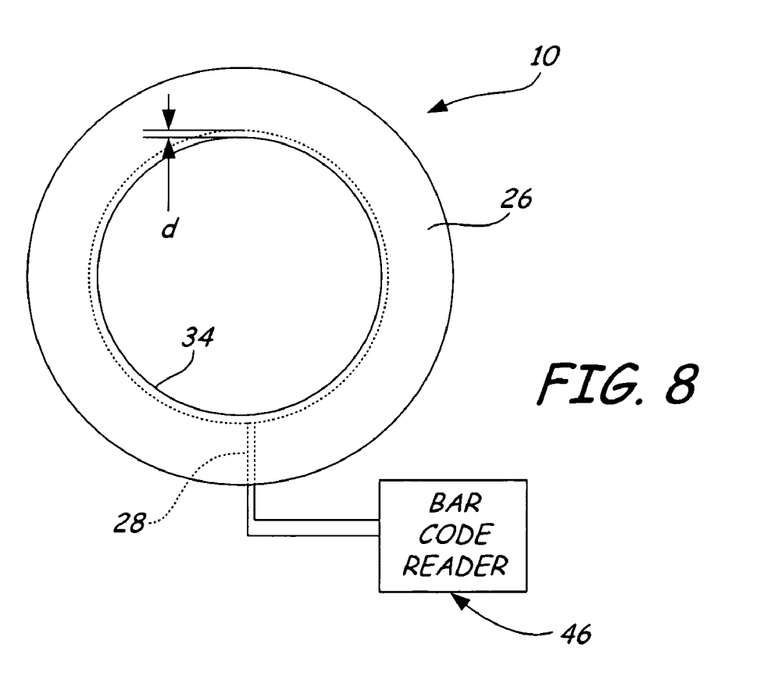
FIG. 8 is an enlarged top view of the embodiment of the seal shown in FIG. 7.

FIGS. 7 and 8 show an alternate embodiment of the seal 10 wherein the optical indicator 28 has only a first post 30. In this embodiment, the optical indicator 28 does not encircle the shaft 14, but merely ends at the specified depth. When wear of the seal body 26 reaches the specified depth (d), the shaft 14 becomes visible to the end of the optical indicator 28, causing an optical change. For example, if the optical indicator 28 is a fiber optic cable and the post 30 is connected to a signaling circuit 46 that transmits a pulsed optical signal, it is possible to detect the pulsed optical signal that is reflected back from the end of the fiber optic cable after each pulse. If the shaft 14 has a bar code 50 printed on one side and in line with the embedded optical indicator 28, when the seal body 26 is worn sufficiently to expose the end of the embedded optical indicator 28, the pulsed signal can be used like a bar code reader to detect a change in the reflected optical signal.

As shown in this alternate embodiment, the shaft 14 reciprocates as indicated by arrow 26. The shaft 14 alternatively rotates or oscillates (i.e. changes a direction of rotation), or otherwise moves with respect to the seal 10. If the shaft 14 rotates, the bar code 50 may be oriented differently on the shaft 14.

Alternatively, instead of a bar code reader, the signaling circuit 46 may simply transmit light through the embedded optical indicator 28. If the embedded optical indicator 28 becomes worn, light escapes from the optical indicator 28 at the worn location 48 and becomes visible to an operator or to an optical sensor, thereby indicating the need for a seal replacement.

Figure 9:
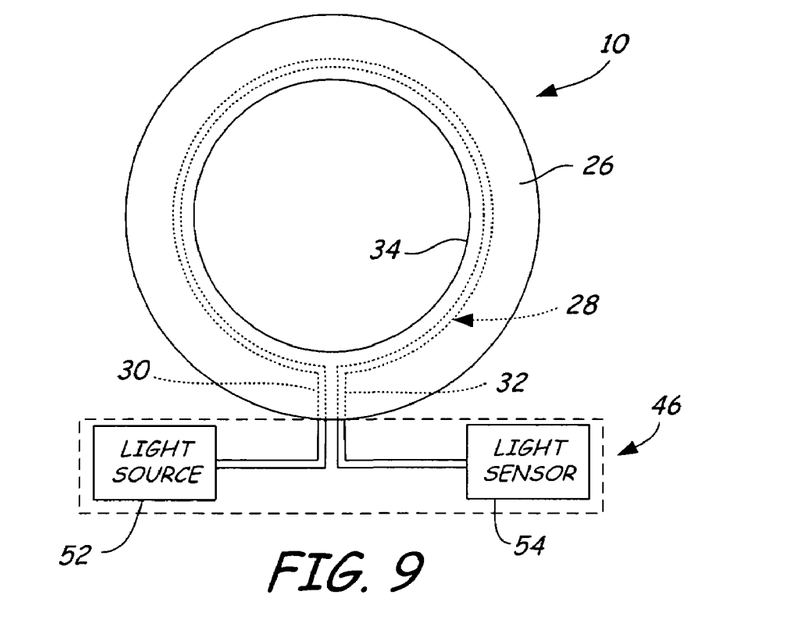
FIG. 9 is a top view of an alternate embodiment of the signaling circuit.

As shown in FIG. 9, the seal 10 has an embedded optical indicator 28 extending around the entire seal body 26. The first post 30 and second post 32 extend from the seal body 26 and are connected to the signaling circuit 46. The first post 30 is connected to a light source 52. The light source 52 may be any light generating source or optical signal generating source. The second post 32 is connected to a light sensor 54, which can be any device capable of detecting an optical signal.

In this embodiment, the signaling circuit 46 includes a light source 52 and a light sensor 54. The light source 52 transmits an optical signal through the embedded optical indicator 28. The light sensor 54 detects the transmitted optical signal. The light sensor 54 generates an alarm signal if it detects a change in the transmitted signal.

Figure 10:
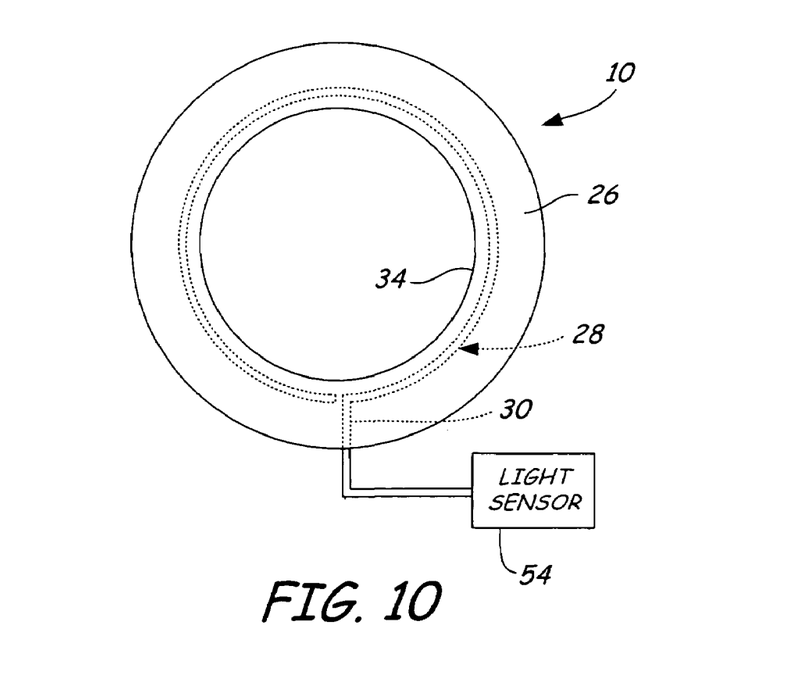
FIG. 10 is a top view of an alternate embodiment of the seal with an embedded optical indicator connected to a sensor

FIG. 10 illustrates an embodiment wherein the embedded optical indicator 28 has only one post 30, which is connected to a light sensor 54. In this embodiment, the light sensor 54 detects an optical change coming from the embedded optical indicator 28. This optical change may be from ambient light. Alternatively, the embedded optical indicator 28 may be coated with or formed from a substance that fluoresces when worn or when exposed to whatever substance is contained by the seal 10. In this instance, when the seal body 26 is worn sufficiently to expose the coating, the coating would glow or otherwise generate a light signal that can be detected by the light sensor 54. An appropriate coating is a fluorescent paint, a reflective paint, or any coating capable of causing a optical change when exposed or worn.

One such coating is be a polymer thin film carrying embedded indicators sensitive to the presence of a certain chemical of interest or sensitive to wear. In this instance, the polymer thin film can be coated on the optical indicator to indicate exposure of the indicator to that chemical. When the seal body 26 wears to the specified depth (d) as described above, the coating on the embedded indicator 28 changes to a distinct identifying color upon contact with the chemical of interest or upon experiencing wear from the relative motion of the shaft 14. Such a coating of indicator-embedded polymer thin films on the embedded optical indicator of this invention may be used to indicate not only exposure of the seal 10 to a certain chemical, but also any possible deterioration or weakening of the seal 10 due to such exposure. Suitable embedded indicators for this application are Polymer thin films with chemical sensitive embedded indicators admixed therein are available from Geo-Centers Inc., Newton Centre, Mass.

Alternatively, by shining an appropriate querying light on the seal 10 with a polymer thin film coated and embedded indicator 28, the color of the indicator 28 can indicate exposure of the seal 10 to the chemical, leaking of the chemical and wear or deterioration of the seal 10 due to the action of the chemical. In a suitable querying light, when the embedded indicator 28 is exposed by wear, the color of the indicator 28 due to the thin film coating is transmitted by an optical fiber back to a light sensor 54. Such a querying light may use at least two light sources, one where the indicator shows the most change and one where it shows the least. Such a querying light is available from Geo-Centers Inc., Newton Centre, Mass., under the trade name "Optrode.". Another suitable querying light may be a flashlight which illuminates using a light-emitting diode (LED) of a proper wave length, rather than an incandescent bulb. Such LED flashlights are available from LEDtronics, Inc., 4009 Pacific Coast Hwy., Torrance, Calif. 90505.

Operation of the Invention

Figure 4:
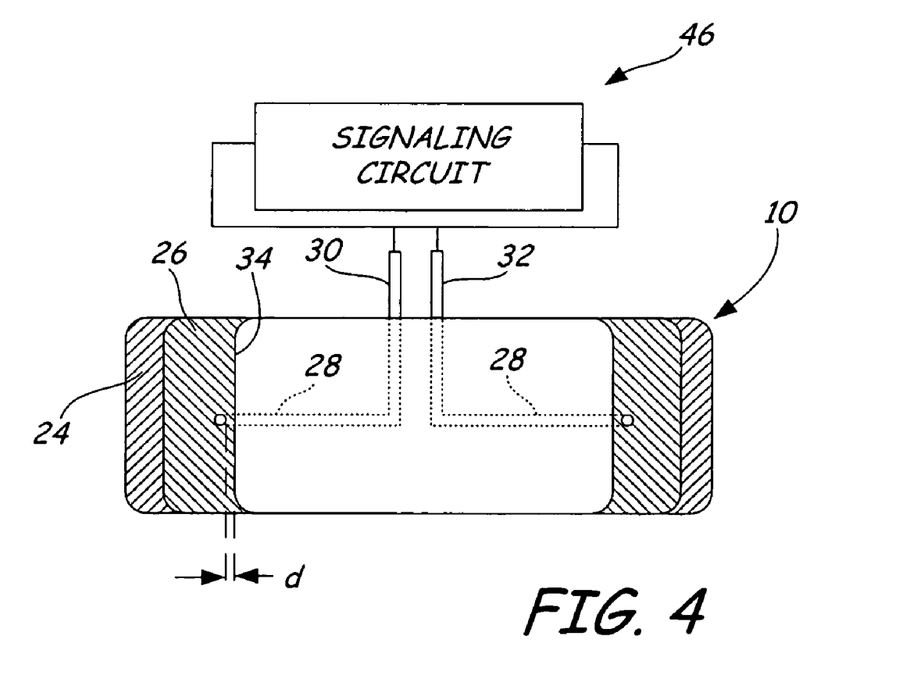
FIG. 4 is a cross-sectional view taken along the line 4-4 in FIG. 3.

Although operation of the present invention is apparent from the preceding description, it will be detailed hereinafter to provide a more complete understanding of the present invention. As the contact surface 34 of the seal body 26 wears away, the optical indicator 28 gradually moves closer and closer to the shaft 14. As seal wear continues, the optical indicator 28 contacts the shaft 14 and wears away along with the seal body 26. The optical indicator 28 is embedded at a specified depth (d) relative to the shaft 14 such that the optical indicator 28 can wear entirely through before the seal 10 begins to leak. When the optical indicator 28 is worn entirely through, as shown in FIGS. 4 and 5 at point 48, there is no longer optical continuity between the first post 30 and the second post 32. Because further wear of the seal body 26 may cause the seal 10 to leak, the absence or change in the optical signal between the first post 30 and the second post 32 indicates to an operator that the seal body 26 has worn to a point such that the seal 10 requires replacement.

Alternatively, the optical indicator 28 may be placed at a specified depth such that exposure of the optical indicator 28 to the moving surface of the shaft 14 occurs at the time when the seal body 26 has worn such that the seal 10 requires replacement. In this case, when the seal body 26 wears to the specified depth (d), an optical change is detected by the signaling circuit 46 or by a light sensor 54, which causes an alarm signal to be sent, indicating to an operator that the seal 10 should be replaced.

The optical optical indicator 28 may be composed of any material which conducts light waves, such as glass, plastic, or fibers of these, also included are glues, resin, lenses, and mirrors. The light may be in the visible spectrum or the invisible spectrum. A source of components of this nature is Edmund Industrial Optics, 101 East Gloucester Pike, Barrington, N.J. 08007-1380.

While it is possible to attach the optical indicator 28 to the outside of the seal body 26, it is preferable to insulate the optical indicator 28 by the seal body 26 or by an insulation layer of a optically opaque material. The opaque layer helps to prevent accidental or premature changes in the optical signal of the optical indicator 28. The insulation layer may be provided by a material which is applied in a liquid or paste form, which dries or cures into a solid material. An example of a material suitable for use as the insulation layer is LIQUID ELECTRICAL TAPE manufactured by Starbright of Fort Lauderdale, Fla.

Although the present invention has been described with reference to a preferred embodiment, workers skilled in the art will recognize that changes may be made in form and detail without departing from the spirit and scope of the invention.

The invention claimed is:

1. A seal for preventing leakage of a fluid from between two members, the seal comprising:
    a seal body for fluid tight contact with both members so as to prevent leakage of fluid between either of the members and the seal body, the seal body being more readily abraded than either of the two members, the seal body being adapted to retain a fluid tight seal with the two members as long as the seal body has not abraded beyond a selected depth;
    an optical conductor positioned approximately at the specified depth within the seal body such that deterioration of the seal body beyond the specified depth causes a change in the optical conductor; and
    a sensor for detecting the change in the optical conductor.

2. The seal of claim 1 wherein the deterioration of the seal body results in less than total internal reflectance within the optical conductor.

3. The seal of claim 1 wherein the two members move relative to one another and wherein the seal maintains the fluid tight contact with both members throughout a range of motion.

4. The seal of claim 1 wherein the two members reciprocate with respect to each other in a fluid tight sealing relationship.

5. The seal of claim 1, wherein the sensor is connected to one end of the optical conductor and further comprising:
   a signaling circuit for transmitting an optical signal through the optical conductor to the sensor.

6. The seal of claim 1 wherein the sensor detects a change in light at the seal and further comprising:
   a signaling circuit for transmitting an optical signal through the optical conductor, such that wear of the optical conductor causes refracted light to escape from worn areas of the conductor.

7. A sealing system for maintaining continuity of a seal between two members to prevent leakage of a fluid, the sealing system comprising:
   a seal body positioned between the two members and adapted to retain a fluid-tight sealed relationship between the two members, the seal body being more readily abraded than the two members by movement of the two members relative to one another, the seal body for maintaining the fluid-tight sealed relationship until the seal body is abraded beyond a specific depth; and
   an optical conductor positioned relative to the seal body such that abrasion of the seal body beyond the specific depth causes an optical discontinuity of the optical conductor, indicating a need for seal body replacement.

8. The sealing system of claim 7 wherein the two members slide with respect to one another in a fluid tight sealed relationship.

9. The sealing system of claim 7 and further comprising:
   a sensor for monitoring an optical change at one end of the optical conductor.

10. The sealing system of claim 7 and further comprising:
    a sensor for monitoring a change in illumination at the seal body.

11. The sealing system of claim 7 wherein the optical conductor is positioned within the seal body approximately at the specific depth.

12. The sealing system of claim 7 further comprising:
    a light source at a first end of the optical conductor for transmitting light through the optical conductor; and
    a sensor positioned at a second end of the optical conductor for receiving and detecting a change in the transmitted light, the change indicating an optical discontinuity in the optical conductor.

13. A method of determining whether a seal that prevents passage of a fluid between two members should be replaced because of wear, the method comprising:
    positioning the seal between and in engaged contact with the two members so as to prevent passage of fluid between the seal and either of the members, the seal being more readily abraded than either of the two members and being adapted to retain a fluid tight seal with the two members as long as the seal body has not abraded beyond a specified depth; and
    associating an optical conductor with the seal such that abrasion of the seal beyond the specified depth causes optical discontinuity of the optical conductor, indicating a requirement for seal replacement.

14. The method of claim 13 wherein the two members move relative to one another in a fluid tight sealing relationship.

15. The method of claim 13 wherein the two members slide or reciprocate with respect to one another in a fluid tight sealing relationship.

16. The method of claim 13 wherein the step of associating an optical conductor comprises:
    embedding the optical conductor in the seal at approximately the specified depth.

17. The method of claim 13 further comprising:
    measuring a change in light over the optical conductor.

18. A seal with a means for detecting replacement conditions comprising:
    a seal body for maintaining a fluid tight sealed relationship between members so as to prevent fluid leakage as long as the seal body has not deteriorated beyond a specific depth; and
    an optical device positionally associated with the seal body such that deterioration of the seal body beyond the specific depth causes the optical device to detect a change with respect to the seal, indicating a need for seal replacement.

19. The seal according to claim 18 wherein the optical device is a spectrometer, the seal further comprising:
    a coating on the optical conductor embedded within the seal body such that as the seal body is abraded, the coating is exposed, the spectrometer detecting the coating when the coating begins to reflect light above a threshold level of luminescence.

20. The seal of claim 19 wherein the coating is a reflective paint.

21. The seal of claim 19 wherein the coating is a flourescent material.

22. The seal of claim 18 wherein the optical device is a conductor embedded within the seal body at the specific depth, the seal further comprising:
    a sensor attached to the optical device such that when the seal body is abraded beyond the specific depth, the sensor detects ambient light from the optical device, signaling the requirement for seal replacement.

23. The seal of claim 18 wherein the optical device is a conductor embedded within the seal body at the specific depth, the seal further comprising:
    a light source attached to one end of the optical device; and
    a sensor positioned proximate to the optical device such that when the seal body is abraded beyond the specific depth, the sensor detects light from the light source through the optical device, signaling the requirement for seal replacement.

* * * * *